United States Patent
Huang et al.

(10) Patent No.: US 9,094,249 B2
(45) Date of Patent: Jul. 28, 2015

(54) APPARATUS HAVING PROGRAMMABLE TAPS

(71) Applicant: TAIWAN SEMICONDUCTOR MANUFACTURING COMPANY, LTD., Hsinchu (TW)

(72) Inventors: Ming-Chieh Huang, San Jose, CA (US); Jing Jing Chen, Los Angeles, CA (US); Chan-Hong Chern, Palo Alto, CA (US); Tao Wen Chung, San Jose, CA (US); Chih-Chang Lin, San Jose, CA (US); Yuwen Swei, Fremont, CA (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/602,900

(22) Filed: Jan. 22, 2015

(65) Prior Publication Data
US 2015/0131711 A1    May 14, 2015

Related U.S. Application Data

(63) Continuation of application No. 13/293,513, filed on Nov. 10, 2011, now Pat. No. 8,971,395.

(51) Int. Cl.
*H04L 27/01* (2006.01)
*H04L 25/03* (2006.01)

(52) U.S. Cl.
CPC ... *H04L 25/03057* (2013.01); *H04L 2025/0349* (2013.01); *H04L 2025/03617* (2013.01)

(58) Field of Classification Search
CPC .......... H04L 25/03057; H04L 2025/0349; H04L 2025/03617
See application file for complete search history.

(56) References Cited

U.S. PATENT DOCUMENTS

| | | | |
|---|---|---|---|
| 3,909,752 A | 9/1975 | Stuart | |
| 4,805,215 A | 2/1989 | Miller | |
| 6,084,907 A | 7/2000 | Nagano et al. | |
| 6,304,598 B1 | 10/2001 | Agazzi et al. | |
| 7,483,479 B2 | 1/2009 | Callicotte et al. | |
| 7,822,114 B2 * | 10/2010 | Bulzacchelli et al. | 375/233 |
| 7,839,922 B2 * | 11/2010 | Chung et al. | 375/233 |
| 8,085,841 B2 * | 12/2011 | Bulzacchelli et al. | 375/233 |
| 8,391,350 B2 | 3/2013 | Chan et al. | |
| 8,406,356 B2 * | 3/2013 | Hollis | 375/350 |
| 2006/0291552 A1 | 12/2006 | Yeung et al. | |
| 2008/0192816 A1 * | 8/2008 | Momtaz | 375/233 |
| 2009/0285277 A1 | 11/2009 | Sunaga et al. | |
| 2011/0182347 A1 | 7/2011 | Cheung | |

* cited by examiner

*Primary Examiner* — Sophia Vlahos
(74) *Attorney, Agent, or Firm* — Lowe Hauptman & Ham, LLP (57) ABSTRACT

An apparatus comprises a plurality of delay elements connected in series. Each delay element is configured to delay a respective input signal and to output a respective delayed signal. The apparatus also comprises a weight generator configured to generate a plurality of tap weights based on the delayed signals. The apparatus further comprises a tap controller configured to (1) generate tap weight enabling signals corresponding to one or more of the tap weights based on a determination that the corresponding tap weights are greater than a predetermined threshold value, and (2) generate a set of bias factors. The apparatus additionally comprises a summer configured to output a weighted signal based on the delayed signals, the tap weight enabling signals, the tap weights, and the bias factors.

20 Claims, 7 Drawing Sheets

APPARATUS HAVING PROGRAMMABLE TAPS

PRIORITY CLAIM

The present application is a continuation of U.S. application Ser. No. 13/293,513, filed Nov. 10, 2011, which is incorporated herein by reference in its entirety.

TECHNICAL FIELD

The present disclosure relates generally to an integrated circuit, and more particularly to a decision feedback equalizer (DFE).

BACKGROUND

A DFE is used to try to equalize the frequency response of a received signal through a channel and increase the eye opening without amplifying noise. Some received signals are interfered by prolonged reflections of previously received signals, making it difficult for the DFE to equalize the frequency response.

BRIEF DESCRIPTION OF THE DRAWINGS

Reference is now made to the following descriptions taken in conjunction with the accompanying drawings.

DETAILED DESCRIPTION

The making and using of various embodiments are discussed in detail below. It should be appreciated, however, that the present disclosure provides many applicable inventive concepts that can be embodied in a wide variety of specific contexts. The specific embodiments discussed are merely illustrative of specific ways to make and use, and do not limit the scope of the disclosure.

Figure 1A:
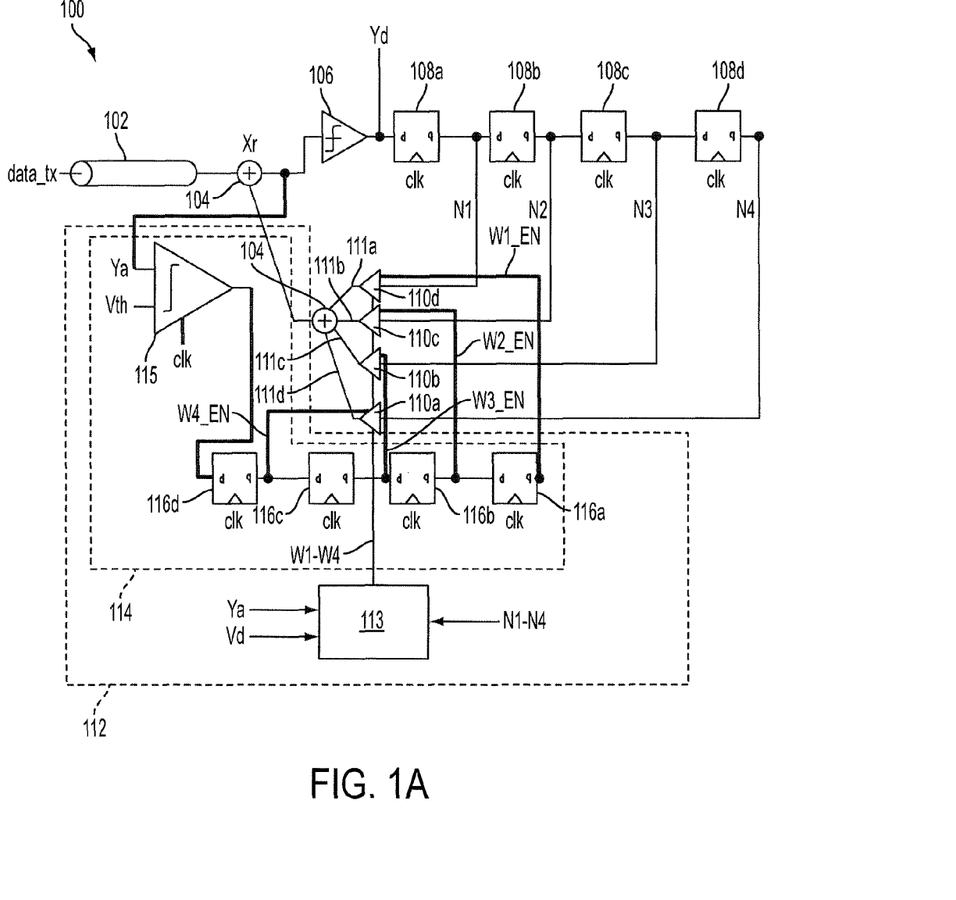
FIG. 1A is a schematic diagram of an exemplary decision feedback equalizer (DFE) with programmable taps according to some embodiments.

FIG. 1A is a schematic diagram of an exemplary decision feedback equalizer (DFE) 100 with programmable taps according to some embodiments. A DFE input signal Xr is received at the DFE 100 when a signal data_tx is transmitted through a channel 102. The DFE 100 includes a summer 104 that receive the DFE input signal Xr. A slicer 106 coupled to the summer 104 converts a summer output Ya to a digital signal Yd. The slicer 106 functions as a buffer as outputs Yd as a digital value, based on its input Ya. In some embodiments, Yd=1 if Ya>0, Yd=−1 if Ya<0, Yd=0 if Ya=0.

Delay elements (e.g., flip-flops) 108a, 108b, 108c, and 108d are coupled to the slicer 106. The delay elements 108a, 108b, 108c, and 108d are operated by a clock signal clk that has a clock cycle T. Even though four delay elements 108a, 108b, 108c, and 108d are shown for the DFE 100, different numbers of delay elements can be used in other embodiments. The number of delay elements may depend on how many delay elements are enough to cover the entire impulse response of the channel. The delay elements 108a, 108b, 108c, and 108d are connected in series. Delay element 108a provides a delayed signal N1 of its input signal Yd. Delay element 108b provides a delayed signal N2 of its input N1. Delay element 108c provides a delayed signal N3 of its input N2. Delay element 108d provides a delayed signal N4 of its input N3.

An arithmetic logic unit (ALU) 112 includes a weight generator 113 and a tap enable control circuit 114. The weight generator 113 generates tap weights W1-W4. A tap is the combination of a delayed signal, e.g., N1, N2, N3, or N4, and a tap weight, e.g., W1, W2, W3, or W4. The tap weight is multiplied to the respective delayed signal for feedback to the summer 104.

At each gain element, e.g., 110a, 110b, 110c, or 110d, each tap weight, e.g., W1, W2, W3, or W4, is multiplied to the respective delayed signal, e.g., N1, N2, N3, or N4, from the respective delay element, e.g., 108a, 108b, 108c, or 108d, to provide a respective tap output, e.g., 111a, 111b, 111c, or 111d. For example, at the gain element 110a, the tap weight W1 is multiplied to the delayed signal n1 from the delay element 108a to provide a tap output 111a. Each tap output, e.g., 111a, 111b, 111c, or 111d, is selectively enabled to be added to the summer 104 or disabled based on a comparison of a threshold value Vth and each impulse response (from a respective delayed signal as shown in FIG. 1B) of the channel 102 corresponding to the respective tap output.

Figure 1B:
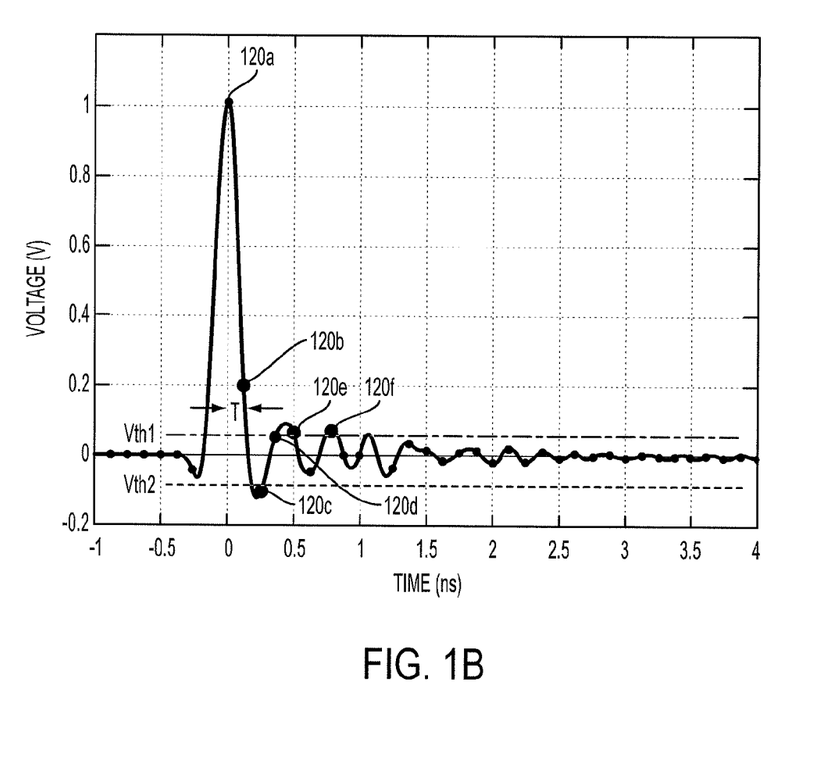
FIG. 1B is an exemplary impulse response for the DFE in FIG. 1A according to some embodiments.

FIG. 1B is an exemplary impulse response for the DFE in FIG. 1A according to some embodiments. An impulse response is the DFE input signal Xr in response to a pulse signal (e.g., a sequence 10000 . . . ) transmitted through the channel 102. Impulse response value 120a is a peak response value corresponding to the transmitted pulse signal. Impulse response value 120b is a delayed response by one clock cycle T, impulse response value 120c is a delayed response by two clock cycles 2T, impulse response value 120d is a delayed response by three clock cycles 3T, and impulse response value 120e is a delayed response by four clock cycles 4T. Each impulse response value 120b, 120c, 120d, or 120e is matched with the respective delayed signal N1, N2, N3, or N4. There are more impulse response values with further delays that are not used. For example, an impulse response value 120f is a delayed response by six clock cycles 6T, but it is not matched to a delayed signal since there are only four delay elements 108a, 108b, 108c, and 108d.

Referring back to FIG. 1A, a comparator 115 in the tap enable control circuit 114 compares the summer output Ya and the threshold value (voltage) Vth at each clock cycle of clk. For example, from FIG. 1B, the impulse response values 120b, 120c, 120d, and 120e at clock cycles 1T, 2T, 3T, and 4T after the peak response 120a are compared to the threshold value Vth. When the impulse response value is greater than Vth, the tap output corresponding to the impulse response value is enabled to be added to the summer 104 and disabled otherwise. In some embodiments, two threshold values can be used, for example, Vth1 and Vth2 (less than Vth1). When the impulse response value is greater than Vth1 or less than Vth2, the tap output corresponding to the impulse response value is enabled to be added to the summer 104 and disabled otherwise.

In some embodiments, up to a specified maximum number of tap outputs are enabled (e.g., four in the DFE in FIG. 1A), and the maximum number is programmable (e.g., can be changed from four to three in the DFE in FIG. 1A). In some applications, fewer taps is good because of faster convergence of tap weights, and faster convergence allows use of a slower DFE frequency and a smaller number of clock cycles of tap weight changes.

Figure 1C:
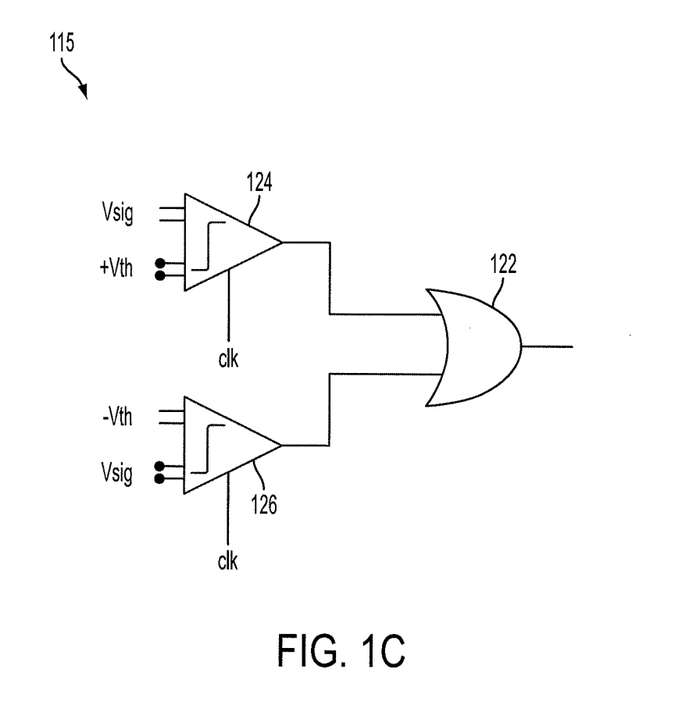
FIG. 1C is a schematic diagram of an exemplary comparator implementation for the DFE in FIG. 1A according to some embodiments.

In one example, Vth1 is equal to +Vth, and Vth2 is equal to −Vth. FIG. 1C is a schematic diagram of an exemplary comparator implementation for the DFE in FIG. 1A according to some embodiment, having threshold value voltages +Vth and −Vth. Two comparators 124 and 126 compare its input signal Vsig with +Vth and −Vth respectively at each clock cycle of clk, and the outputs are supplied to an OR gate 122 that has a logical 1 (for enablement) when the input signal Vsig is either greater than +Vth or less than −Vth.

The comparator 115 output is coupled to four delay elements (e.g., flip-flops) 116a, 116b, 116c, and 116d. During a setup period, a pulse signal is transmitted through the channel 102 and all tap outputs 111a, 111b, 111c, and 111d are disabled. Then the DFE input signal Xr is received by the summer 104 that provides Ya representing an impulse response to the comparator 115. After four clock cycles, impulse response values (e.g. 120b, 120c, 120d, and 120e) are compared to Vth to generate enable signals W1_EN, W2_EN, W3_EN, and W4_EN, for respective tap outputs 111a, 111b, 111c, and 111d.

After the setup period, tap outputs 111a, 111b, 111c, and 111d are enabled or disabled according to the enable signals W1_EN, W2_EN, W3_EN, and W4_EN, respectively. Then data can be transmitted through the channel 102 to update tap weight values W1, W2, W3, and W4 according to a specified algorithm. In one embodiment, tap weights are updated at each clock cycle based on a Sign Sign Least Mean Square (SSLMS) algorithm, and the SSLMS algorithm can be expressed by the following equation:

$$W_i(n+1)=W_i(n)+U_i \cdot \text{sign}\{Err(n)\} \cdot \text{sign}\{Y_d(n-i)\} \quad \text{Equation (1)},$$

where n is an integer denoting the clock cycle; i is a positive integer; Ui is a step size for each tap weight Wi; Err=Yd−Ya; sign(x)=+1 if x>0, 0 if x=0, −1 if x<0. Each tap weight Wi(n) is updated for the next Wi(n+1) by adding the term $U_i \cdot \text{sign}\{Err(n)\} \cdot \text{sign}\{Y_d(n-i)\}$. Also, the Ya after the summer 104 at each clock cycle is given by the following equation:

$$Y_a(n)=X_r(n)+\Sigma Wi(n)Ni(n)=X_r(n)+\Sigma Wi(n)Y_d(n-i) \quad \text{Equation (2)},$$

where Yd(n−i) is delayed signal Ni (delayed by i times the clock cycle), n is an integer denoting the clock cycle, and i is a positive integer.

For example, if the DFE input signal is given as Xr=[1− 1.2−0.7−0.9] (from the first to the fourth clock cycle) and two tap weights W1 and W2 are used, W1 and W2 are given by the following according to Equation (1):

$$W1(n+1)=W1(n)+U1*\text{sign}[Err(n)]*\text{sign}[Yd(n-1)];$$

$$W2(n+1)=W2(n)+U2*\text{sign}[Err(n)]*\text{sign}[Yd(n-2)]; \quad \text{Equation (3)},$$

where the initial values are U1=U2=0.01, Yd(0)=Yd(−1)=0, W1(1)=W1(2)=W2(1)=W2(2)=0.

From the above, Ya(1)=Xr(1)+W1(1)*Yd(0)+W2(1)*Yd (−1)=1+0*(0)+0*(0)=1, and Yd(1)=1. From Ya(2)=Xr(2)+ W1(2)*Yd(1)+W2(2)*Yd(0)=−1.2+0*(1)+0*(0)=−1.2, Yd(2)=−1. Thus, Err(2)=Yd(2)−Ya(1)=(−1)−(−1.2)=0.2, and sign(Err(2))=1. The W1 and W2 values are updated as the following:

$$W1(3)=W1(2)+U1*\text{sign}(Err(2))*\text{sign}(Yd(1))=0+0.01* (1)*(1)=0.01.$$

$$W2(3)=W2(2)+U2*\text{sign}(Err(2))*\text{sign}(Yd(0))=0+0.01* (1)*(0)=0.$$

Likewise, for the next clock cycle, Ya(3)=Xr(3)+W1(3) *Yd(2)+W2(3)*Yd(1)=−0.7+0.01*(−1)+0*(1)=−0.71, thus Yd(3)=−1, and Err(3)=Yd(3)−Ya(3)=(−1)−(−0.71)=−0.29. Therefore, W1(4)=W1(3)+0.01*sign(Err(3))*sign(Y(2)) =0.01+0.01*(−1)*(−1)=0.02; W2(4)=W2(3)+0.01*sign(Err (3))*sign(Y(1))=0+0.01*(−1)*(1)=−0.01.

Likewise, for the next clock cycle, Ya(4)=−0.9+0.02*(−1)+ (−0.01)*(−1)=−0.91, thus Err(4)=(−1)−(−0.91)=−0.09. And W1(5)=W1(4)+0.01*sign((4))*sign(Yd(3))=0.02+0.01*(− 1)*(−1)=0.03; W2(5)=W2(4)+0.01*sign(Err(4))*sign(Yd (2))=−0.01+0.01*(−1)*(1)=0; and so on for the following clock cycles.

The tap weights Wi are updated at each clock cycle and will converge to certain values after a certain time that depends on the different application, channel, and embodiments. After the tap weight values are converged, the change in the tap weight values is relatively small. The step size Ui is adjusted in some embodiments. For example, the step size Ui can be reduced for finer adjustment. There is less operational interruptions between the DFE 100 and other circuits, e.g., a clock and data recovery (CDR), when step size Ui is smaller, because of the smaller tap weight Wi change at each clock cycle. For disabled tap outputs, the corresponding step size is zero in some embodiments.

For some applications, the first tap output results from multiplying the first tap weight (e.g., W1) and the first delayed signal (N1, which is delayed one clock cycle from the DFE input signal) from the beginning and stays enabled in some embodiments. This is because the first tap output improves the eye opening significantly for those applications.

For the DFE 100, the enabled tap outputs, i.e., the tap locations that are programmable, allows the DFE 100 to deal with the channel 102 having different impulse response (reflection) characteristics. Because tap outputs are selectively enabled (when the corresponding impulse response is above a certain threshold value), the DFE 100 saves power and can be applied for impulse responses that arrive significantly later than the incident data if there are sufficient number of tap outputs. The number of enabled tap outputs is programmable. While with a reduced number of enabled tap outputs, the tap weights Wi may converge faster, with a greater number of enabled tap outputs, more impulse responses can be accounted for.

Figure 2:
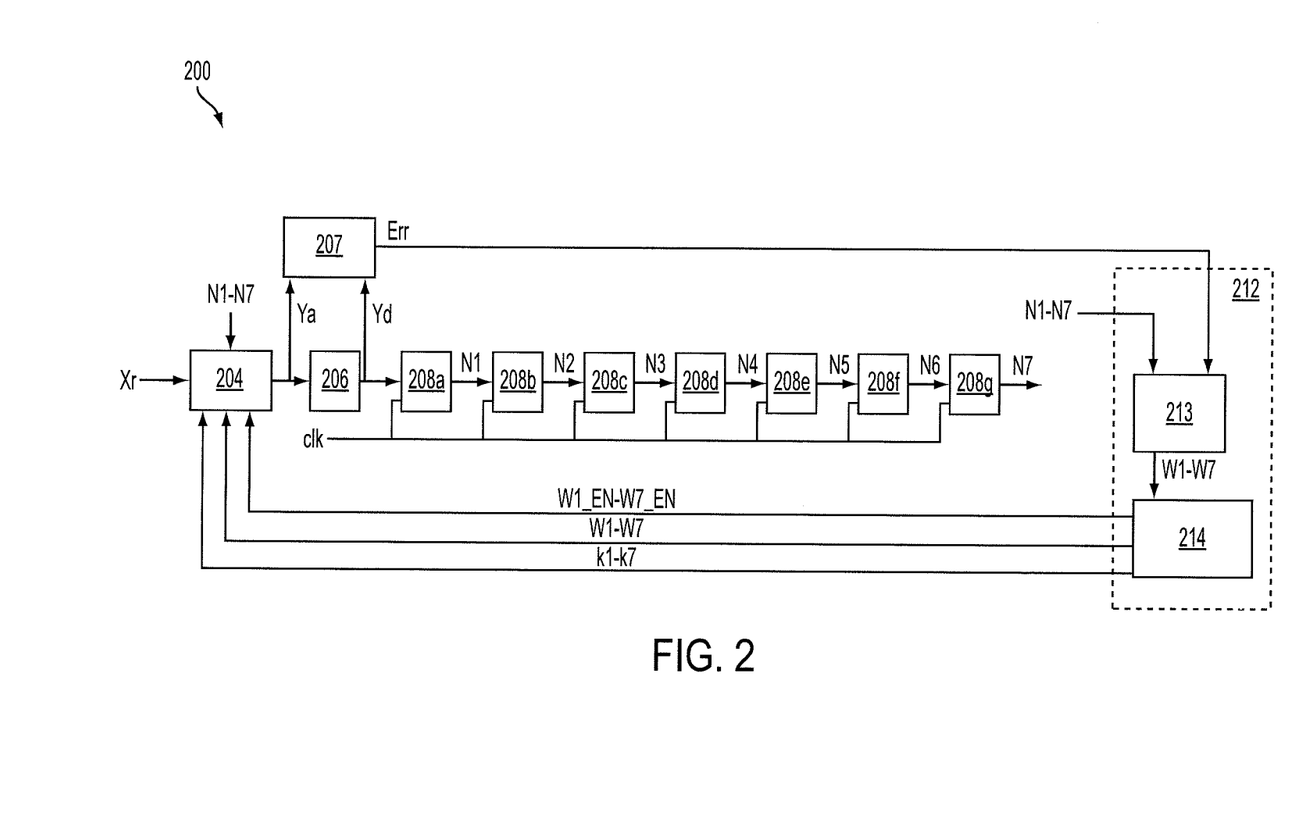
FIG. 2 is a schematic diagram of another exemplary DFE with programmable taps according to some embodiments.

FIG. 2 is a schematic diagram of another exemplary DFE 200 with programmable taps according to some embodiments. A slicer 206 functions similar to the slicer 106 of FIG. 1A. In the DFE 200, there are seven delay elements 208a, 208b, 208c, 208d, 208e, 208f, and 208g that outputs delayed signals N1, N2, N3, N4, N5, N6, and N7 respectively. A summer 204 receives the DFE input signal Xr, the delayed signals N1-N7, enable signals W1_EN-W7_EN, tap weights W1-W7, and bias factors k1-k7 from a tap enable control circuit 214. In one example, a maximum number of five tap outputs are selected from the tap enable control circuit 214 for enablement (i.e., a maximum of five enable signals are asserted). In other embodiments, a different maximum number of tap outputs can be programmed for enablement. Smaller numbers of enabled tap outputs may provide a faster convergence, while a larger number of tap outputs may be more effective for a high reflection channel. The number of maximum enabled tap outputs depends on channel characteristics and applications.

A weight generator 213 in an arithmetic logic unit (ALU) 212 is based on the Sign Sign Least Mean Square (SSLMS) algorithm to update tap weights, and its operation is similar to weight generator 113 described above in reference to FIG. 1A. An error generator 207 calculates the error signal Err=Yd−Ya for the calculation of the SSLMS algorithm. The weight generator 213 receives Err and N1-N7 and updates tap weights W1-W7 at each clock cycle. The example described above for FIG. 1A can be applied to the DFE 200. (The error generator 207 is incorporated in the weight generator 113.)

In the DFE 200, after tap weights W1-W7 have converged with certain training bits or certain clock cycles, a tap enable control circuit 214 compares each tap weight to a threshold value Vth, and tap weights greater than the threshold value Vth are selected to enable corresponding tap outputs (that are added in the summer 204). For example, if the maximum number tap weights for enablement is five and four tap weights (W1, W2, W3, and W6) are greater than Vth, then the corresponding four tap outputs are enabled by the enable signals (i.e., W1_EN, W2_EN, W3_EN, and W6_EN are asserted). If five tap weights (W1, W2, W4, W6, and W7) are greater than Vth, then the corresponding five tap outputs are enabled by the enable signals (i.e., W1_EN, W2_EN, W4_EN, W6_EN, and W7_EN are asserted). If there are more than five tap weights greater than the threshold value, five tap weights can be selected based on any user defined criteria. For example, if W1, W2, W4, W5, W6, W7 are greater than Vth, then W1, W2, W4, W5, and W6 can be selected.

Bias factors k1-k7 corresponding to tap weights W1-W7 are also sent from the tap enable control circuit 214 for scaling purpose to the summer 204. In some embodiments, if each respective tap weight (Wi) is less than a specified value, the bias element ki is decreased to adjust the tap weight scaling. For example, if the tap weight Wi having 5 bits <4:0> is less than 16 (10000 in binary), the corresponding bias element ki is reduced. If the current control bits for the bias element k1=11 (binary), then k1 is decreased to k1=10 (binary) in some embodiments. More details regarding bias factors ki are described below in FIG. 4. Even though seven tap weights W1-W7 are shown in FIG. 2, any other number of tap weights can be used in other embodiments.

Figure 3:
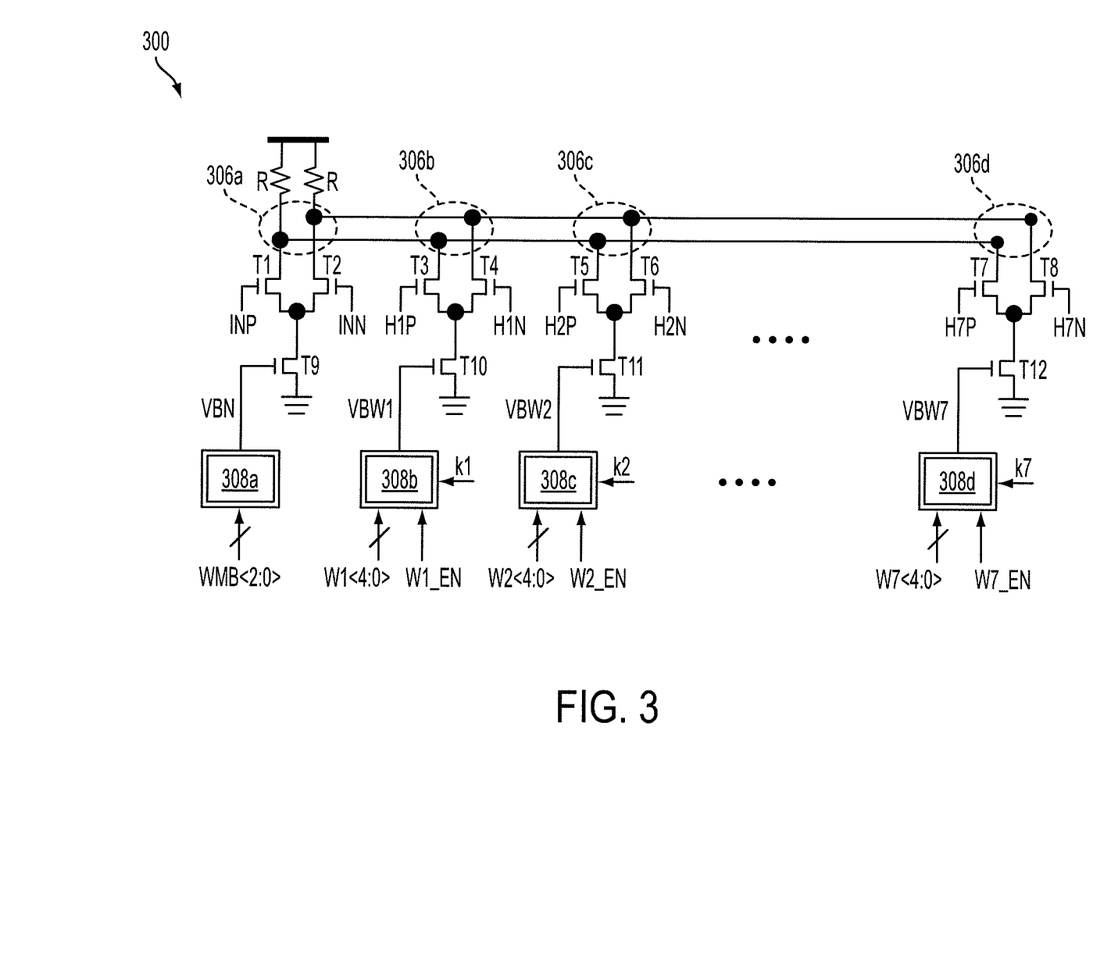
FIG. 3 is a schematic diagram of an exemplary summer for the DFE in FIG. 1A or FIG. 2 according to some embodiments.

FIG. 3 is a schematic diagram of an exemplary summer 300 for the DFE in FIG. 1A or FIG. 2 according to some embodiments. The summer 300 includes nodes INP and INN for DFE input signal Xr, nodes H1P and H1N for the delayed signal N1, nodes H2P and H2N for the delayed signal N2, ..., and nodes H7P and H7N for the delayed signal N7. For example, if the delayed signal N1 is "1", then "1" is supplied to H1P and "0" is supplied to H1N; if the delayed signal N1 is "4", then "0" is supplied to H1P and "1" is supplied to H1N; and if the delayed signal N1 is "0", then "0" is supplied to H1P and H1N in some embodiments.

Currents through resistors R and NMOS transistors T1 and T2 are controlled by the DFE input signal Xr and contribute to the voltage level at nodes 306a. Currents through NMOS transistors T3 and T4 are controlled by the delayed signal N1 and contribute to the voltage level at nodes 306b. Currents through NMOS transistors T5 and T6 are controlled by the delayed signal N2 and contribute to the voltage level at nodes 306c. Currents through NMOS transistors T7 and T8 are controlled by the delayed signal N7 and contribute to the voltage level at nodes 306d. Similar circuits for delayed signals N3, N4, N5, and N6 are omitted for simplicity in FIG. 3. The summer output voltage is provided through the nodes 306a, which includes all contributions from currents based on the DFE input signal Xr and the tap weights W1, W2, ..., and W7.

A weight bias generator 308a provides a bias voltage VBN to the gate of an NMOS transistor T9, based on control bits WMB (e.g., 3 bits <2:0>). A weight bias generator 308b provides a bias voltage VBW1 to the gate of an NMOS transistor T10, based on the tap weight W1 (e.g., 5 bits <4:0>). The enable signals (i.e., W1_EN, W2_EN, ..., and W7_EN) are provided to the weight bias generator 308a to allow a respective bias voltage (i.e., VBW1, VBW2, ..., and VBW7) be provided when the enable signals are enabled. A weight bias generator 308c provides a bias voltage VBW2 to the gate of an NMOS transistor T11, based on the tap weight W2 (e.g., 5 bits <4:0>). A weight bias generator 308d provides a bias voltage VBW7 to the gate of an NMOS transistor T12, based on the tap weight W7 (e.g., 5 bits <4:0>). Similar circuits for tap weights W3, W4, W5, and W6 are omitted for simplicity in FIG. 3. Even though seven tap weights W1-W7 are shown in FIG. 2, any other number of tap weights can be used in other embodiments.

Figure 4:
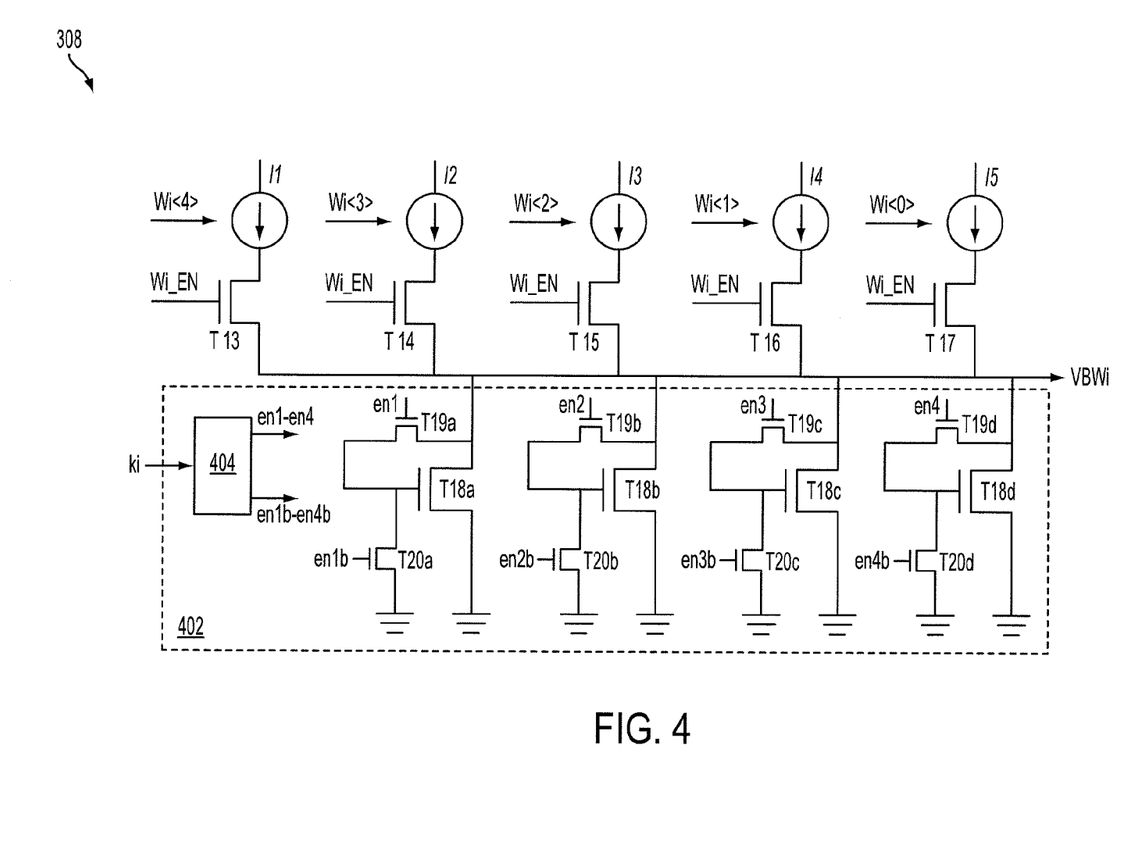
FIG. 4 is a schematic diagram of an exemplary weight bias generator of the summer in FIG. 3 according to some embodiments.

FIG. 4 is a schematic diagram of an exemplary weight bias generator 308 of the summer 300 in FIG. 3 according to some embodiments. The weight bias generator 308 is an exemplary implementation for the weight bias generators 308b, 308c and 308d. The weight bias generator 308 includes five current sources I1, I2, I3, I4, and I5 corresponding to the five-bit the tap weight Wi<4:0> (where i=1, 2, ..., 7). Each current source is controlled (i.e., enabled or disabled) by its corresponding tap weight bits, e.g., Wi<4>, Wi<3>, Wi<2>, Wi<1>, and Wi<0>. The current ratio of the current sources can be, for example, I1: I2: I3: I4: I5=$2^4:2^3:2^2:2^1:2^0$, or any other convenient ratio for the application. The weight bias generator 308 can be used for the weight bias generator 308a with a reduced number of current sources (three current sources corresponding to 3-bit control bits WMB<2:0>).

Each current source I1, I2, I3, I4, or I5, is connected to a respective transistor T13, T14, T15, T16, or T17, which is controlled by the tap output enable signal Wi_EN (where i=1, 2, ..., 7). The currents from the enabled current sources I1, I2, I3, I4, and I5 flow through a tunable transistor block 402 and provides an output voltage VBWi (where i=1, 2, ..., 7). The tunable transistor block 402 includes multiple NMOS transistors T18a, T18b, T18c, and T18d controlled by enable bits en1, en2, en3, and en4, and their complementary enable bits en1b, en2b, en3b, and en4b.

Enable bits en1, en2, en3, and en4, when activated (e.g., a logical 1) connect NMOS transistors T18a, T18b, T18c, and T18d in a diode-connected mode and control the current amount through the tunable transistor block 402 by turning on NMOS transistors T19a, T19b, T19c, and T19d. The complementary enable bits en1b, en2b, en3b, and en4b have opposite values of the enable bits en1, en2, en3, and en4. When the complementary enable bits en1b, en2b, en3b, and en4b have a logical 1, the gates of respective NMOS transistors T18a, T18b, T18c, and T18d are connected to ground by turning on respective NMOS transistors T20a, T20b, T20c, and T20d.

The bias factor ki is received by the enable bit generator 404, which generates enable bits en1, en2, en3, and en4 (and their complements en1b, en2b, en3b, and en4b). For example, if ki=00, then en1=1, en2=1, en3=1, and en4=1; if ki=01, then en1=1, en2=1, en3=1, and en4=0; if ki=10, then en1=1, en2=1, en3=0, and en4=0; if ki=11, then en1=1, en2=0, en3=0, and en4=0. By changing the number of enabled diode-connected transistors with bias factor ki control bits, the effective transistor width from the tunable transistor block 402 is changed. When ki is decreased, more diode-connected transistors are enabled, thus more current will flow through the tunable transistor block 402, and VBWi decreases. When ki is increased, less diode-connected transistors are enabled, thus less current will flow through the tunable transistor block 402, and VBWi increases.

The weight bias generator 308 receives a respective bias factor ki, e.g. k1, k2, . . . , or k7, from the tap enable control circuit 214. Bias factors k1-k7 corresponding to each tap weight W1-W7 is also sent from the tap enable control circuit 214 for scaling purposes to the summer 204. In some embodiments, if each respective tap weight (Wi) is less than a specified value, the bias element ki is decreased to adjust the tap weight scaling. For example, if the tap weight Wi having 5 bits <4:0> is less than 16 (10000 in binary), the corresponding bias element ki is reduced. If the current control bits for the bias element is ki=11 (binary), then ki can be decreased to ki=10 (binary), which decreases VBWi as described above.

With decreased VBWi, the tap weight Wi converges to an increased value and brings the VBWi close to the previous VBWi value (prior to adjusting ki). In one embodiment, when the current through the tunable transistor block 402 is doubled with ki adjustment, the tap weight Wi is also doubled. After Wi converges to a higher value, the same value change in Wi has relatively less overall change on the Wi. Thus, having a smaller ki may reduce interference between the DFE 200 and other circuits, e.g., a clock and data recovery (CDR) in some applications, because of the relatively smaller tap weight Wi change at each clock cycle.

On the other hand, with a higher ki, VBWi is increased as described above. With increased VBWi, the tap weight Wi converges to a decreased value and brings the VBWi close to the previous VBWi value (prior to adjusting ki). After Wi converges to a lower value, the same value change in Wi when updated at each clock cycle has relatively more overall change on the Wi. Thus, having a higher ki can help to produce a faster convergence of Wi.

Figure 5:
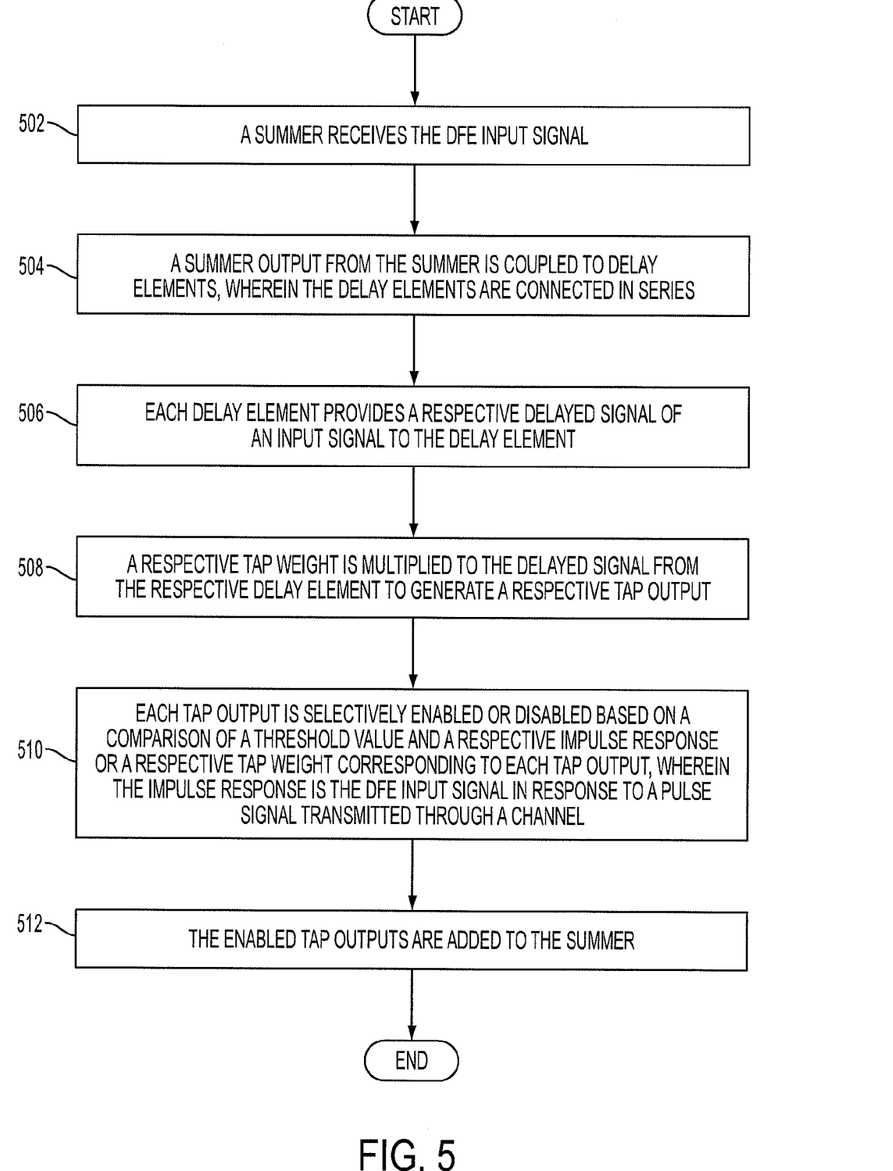
FIG. 5 is a flowchart of a method of operating the DFE in FIG. 1A or FIG. 2 according to some embodiments.

FIG. 5 is a flowchart of a method of operating the DFE in FIG. 1A or FIG. 2 according to some embodiments. At step 502, a summer (in the DFE) receives the DFE input signal. At step 504, a summer output from the summer is coupled to delay elements. The delay elements are connected in series. At step 506, each delay element provides a respective delayed signal of an input signal to the delay element. At step 508, a respective tap weight is multiplied to the delayed signal from the respective delay element to generate a respective tap output. At step 510, each tap output is selectively enabled or disabled based on a comparison of a threshold value and a respective impulse response or a respective tap weight corresponding to each tap output. The impulse response is the DFE input signal in response to a pulse signal transmitted through a channel. At step 512, the enabled tap outputs are added to the summer.

In various embodiments, a slicer is coupled between the summer and the first delay element. The other delay elements are connected in series after the first delay element. The tap weights are updated at each clock cycle based on a Sign Sign Least Mean Square (SSLMS) algorithm. The first sign element of the SSLMS algorithm is calculated based on the subtraction of a slicer input from a slicer output. The second sign element of the SSLMS algorithm is calculated based on the slicer output. A bias factor of the summer is decreased if each respective tap weight is less than a specified value, so that a tap weight change at each clock cycle has relatively less overall effect on the tap weight.

In various embodiments, up to a specified maximum number of tap outputs are enabled and the maximum number is programmable. Each tap output is selectively enabled or disabled based on a comparison of a lower threshold value and each impulse response or each tap weight corresponding to the respective tap output. The first tap output that results from multiplying the first tap weight and the first delayed signal, which is delayed one clock cycle from the DFE input signal, is enabled.

An aspect of this description relates to an apparatus comprises a plurality of delay elements connected in series. Each delay element of the plurality of delay elements is configured to delay a respective input signal and to output a respective delayed signal. The apparatus also comprises a weight generator coupled with the delay elements of the plurality of delay elements. The weight generator is configured to generate a plurality of tap weights based on the delayed signals output by the delay elements of the plurality of delay elements. The apparatus further comprises a tap controller coupled with the weight generator. The tap controller is configured to (1) generate tap weight enabling signals corresponding to one or more of the tap weights based on a determination that the corresponding tap weights are greater than a predetermined threshold value, and (2) generate a set of bias factors, each of the bias factors of the set of bias factors being based on a corresponding tap weight of the plurality of tap weights. The apparatus additionally comprises a summer coupled with the delay elements of the plurality of delay elements and the tap controller. The summer is configured to output a weighted signal based on the delayed signals output by the delay elements of the plurality of delay elements, the tap weight enabling signals, the tap weights of the plurality of tap weights that correspond to the tap weight enabling signals, and the bias factors of the plurality of bias factors.

Another aspect of this description relates to a method that comprises generating a plurality of tap weights based on a plurality of delayed signals output by a plurality of delay elements coupled in series using a weight generator coupled with the delay elements of the plurality of delay elements. The delayed signals of the plurality of delayed signals are individually generated by each delay element of the plurality of delay elements. The method also comprises generating, using a tap controller coupled with the weight generator, tap weight enabling signals corresponding to one or more of the tap weights based on a determination that the corresponding tap weights are greater than a predetermined threshold value. The method further comprises generating, using the tap controller, a set of bias factors. Each of the bias factors of the set of bias factors is based on a corresponding tap weight of the plurality of tap weights. The method additionally comprises generating, using a summer coupled with the delay elements of the plurality of delay elements and the tap controller, a weighted signal based on the delayed signals output by the delay elements of the plurality of delay elements, the tap weight enabling signals, the tap weights of the plurality of tap weights that correspond to the tap weight enabling signals, and the bias factors of the plurality of bias factors.

A further aspect of this description relates to an apparatus that comprises a plurality of delay elements connected in series. Each delay element of the plurality of delay elements is configured to delay a respective input signal and to output a respective delayed signal. The apparatus also comprises a weight generator coupled with the delay elements of the plurality of delay elements. The weight generator is configured to generate a plurality of tap weights based on the delayed signals output by the delay elements of the plurality of delay elements. The apparatus further comprises a tap controller coupled with the weight generator. The tap controller is configured to (1) generate tap weight enabling signals corresponding to one or more of the tap weights based on a determination that the corresponding tap weights are greater than a predetermined threshold value, and (2) generate a set of bias factors, each of the bias factors of the set of bias factors being based on a corresponding tap weight of the plurality of tap weights. The apparatus additionally comprises a summer coupled with the delay elements of the plurality of delay elements and the tap controller. The summer is configured to output a weighted signal based on the delayed signals output by the delay elements of the plurality of delay elements, the tap weight enabling signals, the tap weights of the plurality of tap weights that correspond to the tap weight enabling signals, and the bias factors of the plurality of bias factors. The apparatus also comprises an analog to digital converter coupled with the summer. The analog to digital converter is configured to convert the weighted signal to a digital signal. The digital signal is a first input signal received by a first delay unit of the plurality of delay units. The apparatus further comprises an error generator coupled with the summer and the analog to digital converter. The error generator is configured to compare the weighted signal with the digital signal The weight generator is configured to change the tap weights of the plurality of tap weights based on an output of the error generator.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure.

The above method embodiment shows exemplary steps, but they are not necessarily required to be performed in the order shown. Steps may be added, replaced, changed order, and/or eliminated as appropriate, in accordance with the spirit and scope of embodiment of the disclosure. Embodiments that combine different claims and/or different embodiments are within the scope of the disclosure and will be apparent to those skilled in the art after reviewing this disclosure.

What is claimed is:

1. An apparatus, comprising:
    a plurality of delay elements connected in series, each delay element of the plurality of delay elements being configured to delay a respective input signal and to output a respective delayed signal;
    a weight generator coupled with the delay elements of the plurality of delay elements, the weight generator being configured to generate a plurality of tap weights based on the delayed signals output by the delay elements of the plurality of delay elements;
    a tap controller coupled with the weight generator, the tap controller being configured to (1) generate tap weight enabling signals corresponding to one or more of the tap weights based on a determination that the corresponding tap weights are greater than a predetermined threshold value, and (2) generate a set of bias factors, each of the bias factors of the set of bias factors being based on a corresponding tap weight of the plurality of tap weights; and
    a summer coupled with the delay elements of the plurality of delay elements and the tap controller, the summer being configured to output a weighted signal based on the delayed signals output by the delay elements of the plurality of delay elements, the tap weight enabling signals, the tap weights of the plurality of tap weights that correspond to the tap weight enabling signals, and the bias factors of the plurality of bias factors.

2. The apparatus of claim 1, further comprising:
    a slicer coupled between the summer and a first delay element of the plurality of delay elements.

3. The apparatus of claim 2, wherein the tap weights of the plurality of tap weights are updated at each clock cycle based on a Sign Sign Least Mean Square (SSLMS) algorithm.

4. The apparatus of claim 3, wherein a first sign element of the SSLMS algorithm is calculated based on subtraction of a slicer input from a slicer output.

5. The apparatus of claim 4, wherein a second sign element of the SSLMS algorithm is calculated based on the slicer output.

6. The apparatus of claim 3, wherein a bias factor of the set of bias factors is decreased if a corresponding tap weight is less than a specified value, and the decrease in the bias factor reduces an effect a tap weight change at each clock cycle has on the corresponding tap weight.

7. The apparatus of claim 1, wherein the tap controller is configured to generate a maximum quantity of tap enable signals, and the maximum quantity is programmable.

8. The apparatus of claim 1, wherein each delay element is a flip-flop.

9. A method, comprising:
    generating a plurality of tap weights based on a plurality of delayed signals output by a plurality of delay elements coupled in series using a weight generator coupled with the delay elements of the plurality of delay elements, the plurality of delayed signals being individually generated by each delay element of the plurality of delay elements;
    generating, using a tap controller coupled with the weight generator, tap weight enabling signals corresponding to one or more of the tap weights based on a determination that the corresponding tap weights are greater than a predetermined threshold value;
    generating, using the tap controller, a set of bias factors, each of the bias factors of the set of bias factors being based on a corresponding tap weight of the plurality of tap weights; and
    generating, using a summer coupled with the delay elements of the plurality of delay elements and the tap controller, a weighted signal based on the delayed signals output by the delay elements of the plurality of delay elements, the tap weight enabling signals, the tap weights of the plurality of tap weights that correspond to the tap weight enabling signals, and the bias factors of the plurality of bias factors.

10. The method of claim 9, further comprising:
    converting the weighted signal from an analog signal to a digital signal using a slicer coupled between the summer and a first delay element of the plurality of delay elements.

11. The method of claim 10, further comprising:
    updating the tap weights of the plurality of tap weights at each clock cycle based on a Sign Sign Least Mean Square (SSLMS) algorithm.

12. The method of claim 11, further comprising:
calculating a first sign element of the SSLMS algorithm based on subtraction of a slicer input from a slicer output.

13. The method of claim 12, further comprising:
calculating a second sign element of the SSLMS algorithm based on the slicer output.

14. The method of claim 11, further comprising:
decreasing a bias factor of the set of bias factors if a corresponding tap weight is less than a specified value to reduce an effect a tap weight change at each clock cycle has on the corresponding tap weight.

15. The method of claim 9, further comprising:
specifying a quantity of tap outputs to be enabled, the specified quantity of tap outputs being less than or equal to a maximum quantity of tap outputs.

16. An apparatus, comprising:
a plurality of delay elements connected in series, each delay element of the plurality of delay elements being configured to delay a respective input signal and to output a respective delayed signal;
a weight generator coupled with the delay elements of the plurality of delay elements, the weight generator being configured to generate a plurality of tap weights based on the delayed signals output by the delay elements of the plurality of delay elements;
a tap controller coupled with the weight generator, the tap controller being configured to (1) generate tap weight enabling signals corresponding to one or more of the tap weights based on a determination that the corresponding tap weights are greater than a predetermined threshold value, and (2) generate a set of bias factors, each of the bias factors of the set of bias factors being based on a corresponding tap weight of the plurality of tap weights;
a summer coupled with the delay elements of the plurality of delay elements and the tap controller, the summer being configured to output a weighted signal based on the delayed signals output by the delay elements of the plurality of delay elements, the tap weight enabling signals, the tap weights of the plurality of tap weights that correspond to the tap weight enabling signals, and the bias factors of the plurality of bias factors;
an analog to digital converter coupled with the summer, the analog to digital converter being configured to convert the weighted signal to a digital signal, the digital signal being a first input signal received by a first delay unit of the plurality of delay units; and
an error generator coupled with the summer and the analog to digital converter, the error generator being configured to compare the weighted signal with the digital signal,
wherein the weight generator is configured to change the tap weights of the plurality of tap weights based on an output of the error generator.

17. The apparatus of claim 16, wherein the weight generator is configured to use the output of the error generator as an input for a Sign Sign Least Mean Square (SSLMS) algorithm to change the tap weights of the plurality of tap weights.

18. The apparatus of claim 17, wherein the weight generator is configured to change the tap weights of the plurality of tap weights each clock cycle.

19. The apparatus of claim 17, wherein the tap controller is configured to change a bias factor of the set of bias factors if a corresponding tap weight is less than a specified value, and the change in the bias factor modifies an effect a tap weight change at each clock cycle has on the corresponding tap weight.

20. The apparatus of claim 16, wherein the tap controller is configured to generate a predetermined quantity of tap enable signals based on a programmable maximum quantity of tap enable signals.

* * * * *